J. D. & J. R. BAUGHMAN.
COASTER BRAKE.
APPLICATION FILED DEC. 4, 1913.
1,099,901.
Patented June 9, 1914.
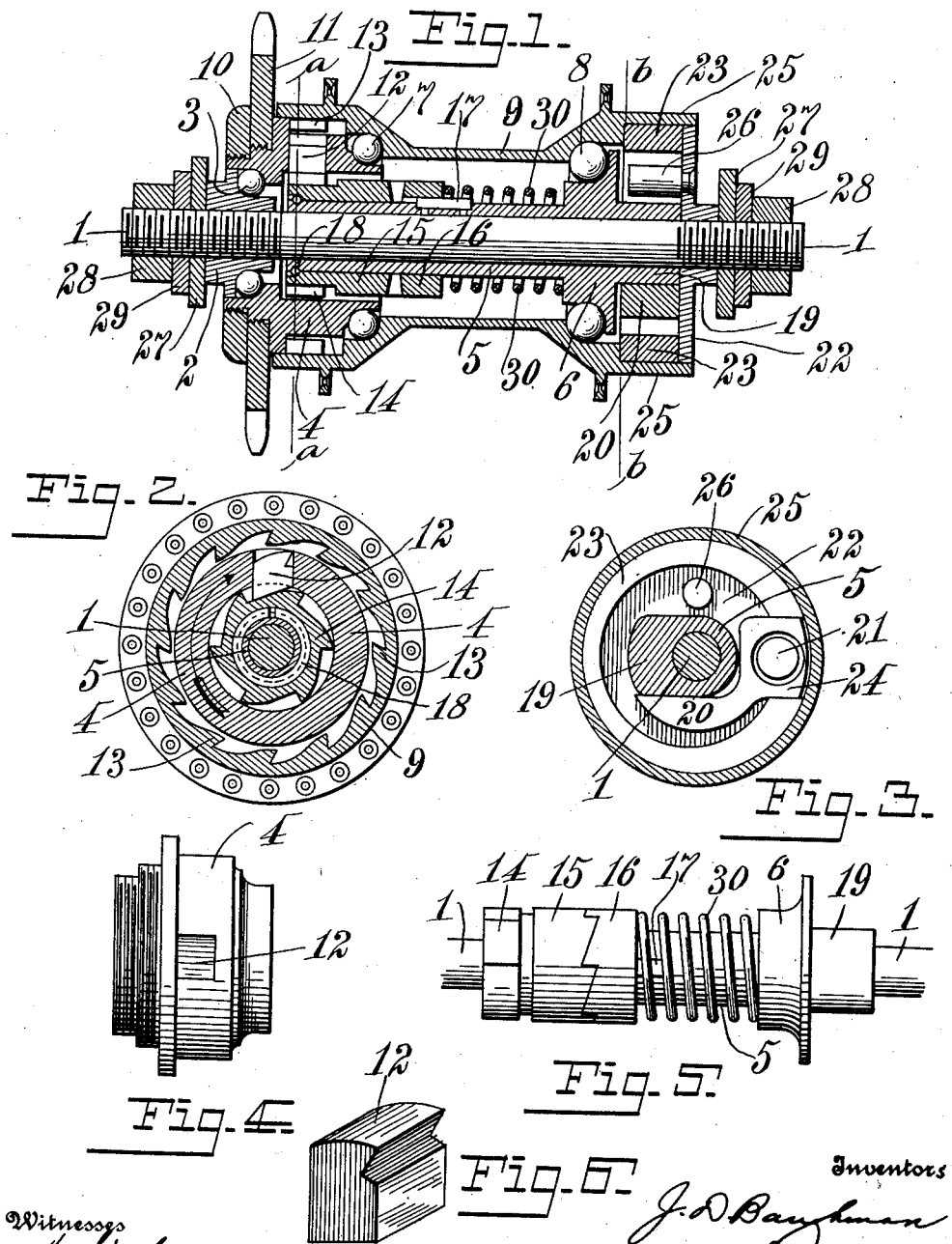

UNITED STATES PATENT OFFICE.

JOSEPH D. BAUGHMAN AND JACOB R. BAUGHMAN, OF DAYTON, OHIO.

COASTER-BRAKE.

1,099,901.  Specification of Letters Patent.  Patented June 9, 1914.

Application filed December 4, 1913. Serial No. 804,564.

*To all whom it may concern:*

Be it known that we, JOSEPH D. BAUGHMAN and JACOB R. BAUGHMAN, citizens of the United States, residing at Dayton, in the county of Montgomery and State of Ohio, have invented certain new and useful Improvements in Coaster-Brakes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to new and useful improvements in coaster-brakes for bicycles and motorcycles.

As is well known, a coaster-brake comprises means including a brake whereby the bicycle or motorcycle is under the control of the rider and may be checked or stopped at the will of the rider.

The object of our invention is to provide a coaster-brake that may be depended upon at all times to serve the purposes, that is positive and reliable, and which possesses the novel and desirable features to be hereinafter described in connection with the accompanying drawings and succinctly embraced in the claims at the end of the description.

Referring to the accompanying drawings, Figure 1 is a longitudinal sectional view illustrative of our improved coaster-brake; Fig. 2 is a sectional view on the line *a—a* of Fig. 1, showing the ratchets and pawl or dog coöperating therewith; Fig. 3 is a section on the line *b—b* of Fig. 1 showing the brake mechanism; Fig. 4 is a detail view of the driving member; Fig. 5 is a detail view of the brake-actuating means; Fig. 6 is a detail perspective view of the driving pawl.

In a detail description of our invention, similar reference characters indicate corresponding parts or features in the drawings and description.

The well known parts of a bicycle or motorcycle are not illustrated in the drawings although some of them may be incidentally mentioned in the description to follow.

Referring more particularly to the drawings, 1 designates a stationary axle upon which is mounted a fixed bearing cone 2 and a movable sleeve 5 provided with an end bearing cone 6. A driving member 4 is journaled on the cone 2 by means of ball-bearings 3 and has secured to it a sprocket-wheel 11 by means of a jam-nut 10. The sprocket-wheel 11 connects with the pedals of the bicycle or motorcycle (not shown) in a well known manner. The hub 9 of the rear or driving wheel is journaled on the driving member 4 and cone 6 through balls or anti-friction bearings 7 and 8. When the pedals are held stationary, the hub 9 may rotate freely as in coasting, or said hub may be driven from a motor (not shown) in case the device is employed on a motorcycle. A limited rotation of the pedals backward will cause a brake to apply as hereinafter described. When the said pedals are given forward movement the driving member 4 connects with the hub 9 and the wheel is driven from the pedals as follows: A radially movable pawl 12 is slidably mounted in a recess in the said driving member 4. This pawl may be of any form suitable for effecting a proper connection between the driving member 4 and the hub; the said pawl is adapted to engage the cam teeth of a ratchet 13 on the interior of the hub when the driving member 4 is forwardly rotated by the pedals as indicated by the arrow in Fig. 2. When this engagement takes place the driving-wheel of the bicycle is driven positively by the pedals. The formation of the teeth 13 and the outer end of the pawl 12 are such that, when the teeth and pawl come into slight engagement, the pawl will be moved to a position to completely engage the said teeth and such engagement will be maintained while the driving member 4 is driven forward. The inner end of the pawl 12 is in operative relation with the cam-teeth of a ratchet 14 mounted on the sleeve 5 within the circumference of the driving member 4. The ratchet 14 is adapted to move the pawl 12 outwardly to engage the pawl 13. Should the driving member 4 at any time stop in a position with a tooth of the ratchet-wheel 13 and the outer end of the pawl 12 in such positions as to not properly engage, a slight rotation of the inner ratchet 14 will cause a proper engagement between said pawl and the ratchet. This slight movement of the ratchet 14 is permitted by clutch members 15 and 16 as hereinafter described. A back-pedaling or movement of the driving member 4 the reverse of that indicated by the arrow in Fig. 2 will cause the teeth of ratchet 13 to move the pawl 12 in engagement with the ratchet 14 and will cause said ratchet 14 to rotate and the consequent applying of a brake as will appear from the following: The said ratchet 14 is integral with the clutch member 15 which is in operative relation with the clutch member 16, the latter clutch member being splined to the sleeve 5 by a key 17. The said clutch members are maintained in engagement by a spring 30. The pressure of the spring 30 is prevented from moving the ratchet 14 out of alinement with ratchet 13 by a resilient ring 18 which lies in a suitable groove in the end of the sleeve 5 and in an internal recess in the ratchet 14. The clutch connection between the ratchet 14 and the sleeve 5 is only provided in order to permit said ratchet 14 to move forward with the driving member 4, when the pawl 12 and a tooth of the ratchet 13 come top on top or improperly engage, as before indicated. When the ratchet 14 is rotated backward by the driving member or in a direction the reverse of that shown in Fig. 2, which is done by back pedaling, the ratchet 14 and sleeve 5 rotate in unison, the teeth of the ratchet 13 camming the pawl 12 into engagement with the ratchet 14, as before indicated.

The end of the sleeve 5 opposite the ratchet 14 is provided with a cam 19 adapted to engage a lever 20 mounted on a pin 21 attached to a stationary disk 22. The disk 22 is mounted on the spindle 1 and incloses that end of the hub 9. The said cam 19 is adapted to actuate the head 24 of the lever 20 to expand the resilient brake-band 23 against the inner surface of the drum 25 which forms one end of the hub 9. The said brake-band, when not expanded, is instrumental in holding the sleeve 5 and the cam ratchet 14 stationary when said ratchet 14 is acting as a cam to move the pawl 12 into engagement with the ratchet 13 to drive the wheel forward. The movement of the cam 19 in one direction is limited by the extent of movement of the lever 20 and is likewise limited in the other direction by a pin 26 extending from the disk 22. The pin 26 maintains the cam 19 in a position to immediately actuate the brake lever 20 when the cam is actuated in the proper direction.

The axle 1 is held firmly in the rear forks 27 of the frame of the bicycle or motorcycle by nuts 28 and washers 29 in a well known manner.

We do not desire to limit ourselves to the details of construction herein shown and described for details may be more or less varied without departing from the essentials of the invention which consists of a connecting element which is free from a dependence upon spring action and which may be placed in engagement with either a brake mechanism or a driving hub.

The operation of the device is as follows:
With the parts in the position shown in the drawings, the hub 9 is free to rotate on the bearings 7 and 8. When the sprocket 11 and member 4 are moved in the direction of the arrow as shown in Fig. 2, the cam teeth 14 will move the pawl 12 into engagement with the teeth 13, thereby driving the hub 9 from the sprocket 11. If, for any reason, the teeth of the ratchets 14 and 13 should stop, with their points one over the other and the pawl 12 become wedged therebetween, the ratchet 14 will recede slightly owing to the connection between said ratchet 14 and the sleeve 5 which connection consists of the clutch members 15 and 16 and the spring 30. The spring 30 causes a reëngagement of the clutch members after they have become disengaged and the pawl 12 is in complete engagement with the teeth 13. When the sprocket 11 and driving member 4 are moved in a direction the reverse of that shown by the arrow, Fig. 2, the pawl 12 will be placed in engagement with the ratchet 14, thereby rocking the sleeve 5 and spreading the brake band 23 against the inside of the drum 25, through the agency of the cam 19 and lever 20.

Having described our invention, we claim—

1. In a device of the type specified, a stationary member, a driving member mounted on said stationary member, a rotating member mounted on said stationary member and on said driving member, a pawl carried by said driving member and adapted to connect said driving member with said rotating member, and means carried by said stationary member and adapted to move said pawl into engagement with said rotating member.

2. In a device of the type specified, a stationary member, a driving member and a rotating member mounted on said stationary member, a pawl carried by said driving member and adapted to connect said driving member with said rotating member, and a cam mounted on said stationary member and adapted to move said pawl into engagement with said rotating member.

3. In a device of the type specified, a stationary member, a driving member mounted on said stationary member, a rotating member mounted on said stationary member and on said driving member, a connecting member carried by said driving member and adapted to connect said driving member and said rotating member, and a spring-influenced cam mounted on said stationary member and adapted to move said connecting member into engagement with said rotating member.

4. In a device of the type specified, a stationary member, a rotating member mounted thereon, brake mechanism mounted on said stationary member in operative relation with said rotating member, a driving member mounted on said stationary member, means carried by said driving member adapted to connect said driving member with said brake mechanism when said driving member is actuated, and means carried by said rotating member adapted to move said connecting means into engagement with said brake mechanism.

5. In a device of the character specified, the combination with an axle, of a hub rotatably mounted thereon, brake-mechanism mounted on said axle in operative relation with said hub, a driving member mounted on said axle, a pawl slidably mounted in said driving member and adapted to connect said driving member with said brake-mechanism when said driving member is actuated, and means carried by said hub adapted to move said pawl into engagement with said brake-mechanism.

6. In a device of the character specified, a stationary member, a rotating member mounted on said stationary member, brake mechanism mounted on said stationary member and in operative relation with said rotating member, a driving member mounted on said stationary member, a pawl carried by said driving member and adapted to connect said driving member with said brake-mechanism when said driving member is actuated, and means carried by said rotating member and adapted to move said pawl into engagement with said brake-mechanism.

7. In a device of the character specified, a stationary member, a rotating member mounted thereon, brake mechanism mounted on said stationary member and in operative relation with said rotating member, a driving member mounted on said stationary member, a pawl carried by said driving member and adapted to connect said driving member with said brake mechanism when said driving mechanism is actuated, and a cam carried by said rotating member and adapted to move said pawl into engagement with said brake mechanism.

8. In a device of the type specified, a stationary member, a rotating member mounted thereon having an internal cam ratchet, brake mechanism mounted on said stationary member in operative relation with said rotating member, a cam ratchet connected to said brake mechanism, a driving member mounted on said stationary member, a pawl carried by said driving member and adapted to be actuated by the internal cam of said rotating member to connect said driving member with said ratchet of the brake mechanism when said driving member is actuated.

9. In a device of the type specified, the combination with an axle, of a shell or hub rotatably mounted thereon, brake mechanism mounted on said axle in operative relation with said hub or shell, a ratchet resiliently connected to said brake mechanism, a driving member mounted on said axle, a pawl slidably mounted in said driving member and adapted to connect said driving member with said ratchet when said driving member is actuated, and a cam carried by said hub or shell and adapted to move said pawl into engagement with said ratchet.

10. In a device of the type specified, an axle, a shell or hub mounted on said axle, brake mechanism in operative relation with said shell or hub, a driving member, a slidable pawl carried by said driving member, and a cam-ratchet mounted on both said brake mechanism and said shell or hub one of said cam-ratchets being adapted to move said pawl into engagement with the other when said actuating member is rotated.

11. In a device of the character specified, an axle, a hub mounted thereon, brake mechanism in operative relation with said hub, a driving member, a slidable pawl carried thereby, and cam ratchets coöperating with said hub and with the brake mechanism to cause engagements between said slidable pawl and said hub, and said slidable pawl and the brake mechanism.

12. In a device of the type specified, an axle, a hub mounted thereon, brake mechanism in operative relation with said hub, a driving member, a slidable pawl carried by said driving member, and a cam ratchet mounted respectively on said brake mechanism and said hub one of said cam ratchets being spring-controlled and the other being held in a normal position by said brake mechanism, said cam ratchets being adapted to move said pawl into engagement with each other.

13. In a device of the character described, the combination with a stationary axle, of a sleeve mounted thereon terminating at one end in a cam and bearing cone, a clutch mounted on said sleeve, a cam ratchet united to said clutch, a driving member inclosing said cam ratchet, a hub mounted on said driving member and on the cone bearing of the sleeve, an internal cam ratchet on said hub in alinement with said first named cam ratchet, a slidable pawl mounted in said driving member and adapted to engage either of said cam ratchets, and brake devices adapted to be actuated by the cam on said sleeve.

In testimony whereof we affix our signatures, in presence of two witnesses.

JOSEPH D. BAUGHMAN.
JACOB R. BAUGHMAN.

Witnesses:
MELLIE GALLOWAY,
MATTHEW SIEBLER.